United States Patent [19]

Barraqué et al.

[11] 4,269,715

[45] May 26, 1981

[54] PROCESS AND APPARATUS FOR TREATING BY ION EXCHANGE OR ADSORPTION FLUIDS HAVING SOLID PARTICLES SUSPENDED THEREIN

[75] Inventors: Christian Barraqué, Sannois; Jean Burriat, Clamart; Jean-Marie Rovel, Carrieres sur Seine, all of France

[73] Assignee: Degremont, Rueil-Malmaison, France

[21] Appl. No.: 99,719

[22] Filed: Dec. 3, 1979

[30] Foreign Application Priority Data

Dec. 8, 1978 [FR] France .................................. 78 34555

[51] Int. Cl.³ .................................................. B01J 49/00
[52] U.S. Cl. ..................................... 210/675; 210/678; 210/189; 210/275
[58] Field of Search ................... 210/33, 35, 36, 189, 210/270, 274, 275–279

[56] References Cited

U.S. PATENT DOCUMENTS

| | | | |
|---|---|---|---|
| 3,163,597 | 12/1964 | Thrun | 210/36 |
| 3,455,819 | 7/1969 | Crits | 210/274 |
| 3,915,861 | 10/1975 | Marquardt | 210/189 |
| 4,085,042 | 4/1978 | Misumi et al. | 210/33 |
| 4,126,548 | 11/1978 | Misumi et al. | 210/33 |

*Primary Examiner*—Ivars C. Cintins
*Attorney, Agent, or Firm*—Wenderoth, Lind & Ponack

[57] ABSTRACT

A treatment column includes a treatment zone which is completely filled with a bed of granular treatment material. A normal treatment operation includes passing a fluid to be treated in a downward direction through the bed of treatment material, thereby treating the fluid. Solid particles suspended in the fluid are removed by the upper portion of the bed of treatment material and are retained therein. Regeneration of the bed is achieved in a countercurrent direction within the treatment column. Retained solid particles are removed from the upper portion of the bed by periodically removing the upper portion only of the bed from the treatment column and transferring such upper portion to a separate washing column whereat the portion of the bed is cleaned and washed. The thus cleaned and washed treatment material is then returned to the upper portion of the treatment zone within the treatment column to replenish the bed.

18 Claims, 3 Drawing Figures

PROCESS AND APPARATUS FOR TREATING BY ION EXCHANGE OR ADSORPTION FLUIDS HAVING SOLID PARTICLES SUSPENDED THEREIN

BACKGROUND OF THE INVENTION

The present invention is directed to an improved process and apparatus for treating fluids having solid particles suspended therein, and particularly such an improved process or apparatus which will result in improved efficiency in yield.

More particularly, the present invention is directed to such a process and apparatus employing a granular ion exchange or adsorbent material to achieve an ion exchange or adsorption treatment of fluid, for example liquid, to be treated.

Even further, the present invention relates to all types of chemical engineering operations and systems employing such granular ion exchange or adsorbent material which is periodically subjected to a regeneration operation between normal treatment operations during which the fluid is treated. Such systems or operations are conventionally carried out, for example, in sugar refining, in hydrometallurgy, in the treatment of industrial wastewater, and particularly for demineralization of water by ion exchange resins. Accordingly, the following discussion will refer to the present invention as relating to an ion exchange resin system. It is however to be understood that the present invention is not intended to be limited thereby but rather applies to all such operations and systems within the above-discussed scope.

Various types of ion exchange systems are known wherein a liquid to be treated is percolated downwardly through an ion exchange resin bed, and wherein regeneration and washing of the resin bed is achieved by respective upward liquid flows. This type of countercurrent regeneration suffers from one inherent difficulty. That is, in order to achieve an efficient regeneration, the resin bed must be in a relatively compact state when it is traversed by the liquid regeneration agent. However, the ion exchange resins have a density or specific gravity very close to that of the regenerating agent solution, and thus the resin bed tends to be fluidized under the action of the rising flow of liquid regenerating agent through the bed. This fluidization of the resin bed considerably reduces the efficacy and efficiency of the regeneration of the resin bed as a whole, and particularly the lower portion thereof.

Numerous prior art systems have been developed in an attempt to remedy this known disadvantage. Such prior art systems are intended to prevent or inhibit fluidization of the resin bed during regeneration and to promote a homogeneous distribution of the liquid regenerating agent across the bed of granular material.

These known prior art systems may generally be divided into three categories.

A first category of such known systems involve the so-called "water blocking" processes, wherein, for example as disclosed in U.S. Pat. No. 2,891,007, a return collector for the liquid regenerating agent is disposed below the surface of the resin bed. During regeneration, there is a liquid flow in a downward direction which is collected and removed by the collector. Thus, a liquid pressure is achieved over the resin bed. In practice however, it has been found that the resin bed does not remain sufficiently compact, and that the regeneration yield is undesirably low. For example, approximately only 60 to 65% of the resin bed is regenerated. Therefore, the quality of the liquid subsequently treated by the thus regenerated resin bed is undesirably low.

A second category of known systems involve processes of the "air blocking" type, such as disclosed for example in U.S. Pat. Nos. 2,855,364 and 3,687,843. According to this system, a compressed gas is introduced into the top part of the container housing the resin bed, and such gas leaves through a regenerating liquid emptying collector which is disposed approximately ten to thirty centimeters below the upper surface of the resin bed. The operation of this system is conducted in such a manner as to maintain pressure within the interior of the container during the regeneration operation. In a modification of this type of system, there is disclosed in French Pat. No. 72 24 135, a system whereby the top layer of the resin is dried by suction resulting from asperation by a hydroejector. A cover is employed to oppose the expansion of the lower layers of the resin bed. In all of these systems, the container housing of the resin bed is furnished at the level of the resin surface with a grid or with a collector having plungers, whereby the regenerating solution, after having passed through the resin, bed is recovered at the level of the apertures of the collector or of plungers, simultaneously with a variable amount of air. This type of system enables a regeneration yield as high as 75%, but is accompanied by the disadvantage of requiring complex and therefore costly equipment.

A third category of known systems are referred to as "mechanical blocking" systems, whereby there is installed above the resin bed a device which is to reliably maintain a compact state of the resin bed. Movable members, membranes, inflatable compression bodies, or a layer of auxiliary material such as described in French Pat. No. 2,022,828, have been employed for this purpose. This type of system is accompanied by the inherent inconvenience of the necessity of employing accessories which are often complex and fragile. Furthermore, cleaning of the resin bed and removal therefrom of accumulated fine particles of resin are difficult to accomplish.

All of the above known systems inherently suffer from at least one of the disadvantages of not sufficiently compacting the bed of granular material, or of requiring complex equipment, with the result that a uniform distribution of the liquid streams in the resin bed during regeneration is difficult to accomplish.

Furthermore, since it is almost always necessary to periodically eliminate from the resin bed suspended material which is removed from the fluid to be treated and retained within the resin bed, these known systems involve arrangements for unpacking and washing of the resin bed. As employed herein the term "unpacking" is intended to refer to a loosening of the resin bed to facilitate removal therefrom of suspended solid particles. Such unpacking is possible in the prior art systems due to the fact that the resin bed specifically does not totally fill the treatment container, but rather normally fills only approximately 50% to 60% thereof. However, unpacking and washing as carried out in the known systems, normally by injecting water into the resin bed at the base thereof, is less efficient than would be desired, since the speed of the injected water cannot exceed the entrainment speed of the particles to be removed. Furthermore, simple washing of the resin bed by injection of water is likely to be insufficient.

SUMMARY OF THE INVENTION

With the above discussion in mind, it is an object of the present invention to provide an improved process and apparatus for treating fluids having solid particles suspended therein, whereby the above prior art disadvantages are avoided and overcome.

This object is achieved in accordance with the present invention by the provision of a process and apparatus for treating fluids having solid particles suspended therein, whereby there is provided a treatment column having an interior including a treatment zone completely filled with a bed of granular treatment material, and a washing column separate from the treatment column. During a normal treatment operation a fluid to be treated is passed in a downward direction through the bed of treatment material, thereby treating the fluid with the treatment material, and causing solid particles suspended in the fluid to be removed therefrom by an upper portion of the bed of treatment material. The removed solid particles are retained within the upper portion of the bed of treatment material. During periodic regeneration operations, necessary as is known to regenerate or rejuvenate the treatment material, a regenerating agent is passed in an upward direction through the bed of treatment material in the treatment zone within the treatment column. Thus, in accordance with the present invention, the normal treatment operation and the regeneration operation are achieved within the treatment column.

Periodically, the bed of treatment material will be clogged to a predetermined degree due to accumulated retention of the solid particles in the upper portion of the bed of treatment material. At this time, the operation of the treatment column is interrupted and a washing operation is conducted. In accordance with the present invention, the washing operation is achieved by removing the upper portion only of the bed of treatment material from the treatment column by causing the upper portion of the bed to flow from the treatment column in a downward direction. The thus removed upper portion of the bed is introduced into the separate washing column. Unpacking and washing of the portion of the treatment material is achieved within the washing column, to thereby remove the solid particles from the treatment material. After unpacking and washing, the thus washed treatment material is returned from the washing column to the treatment zone to thereby replace the upper portion of the bed of treatment material.

According to the invention, treatment and regeneration are carried out in the same container, i.e. the treatment column, without any of the heretofore necessary prior art auxiliary systems. The mass within the treatment column, i.e. the bed of treatment material, completely fills the treatment zone within the treatment column, and no expansion of the bed occurs during the regeneration operation when rising liquid regeneration fluid flows upwardly through the bed. This thereby overcomes the disadvantages of the prior art systems and ensures a very efficient regeneration.

As is known in the fluid treatment art, and particularly in the water purification technology, the water to be treated which enters the resin bed carries with it impurities, i.e. suspended solid particles, which are retained in the upper portion of the bed of treatment material, i.e. the resin bed. These impurities inhibit the functioning of the resin and add to the loss of charge in the bed. Thus, it is necessary, as is known in the art, to periodically remove such impurities by an operation involving unpacking and washing of the resin bed.

It has been discovered in accordance with the present invention that it is possible to remove only the contaminated fraction or portion of the resin bed from the treatment column and subjecting this fraction or portion to unpacking and washing in an appropriate separate container, for example a washing column. Although this removal of treatment material from the treatment column may at first glance appear to be a step backward in relation to the prior art, in which both regeneration and washing are carried out in the same container, it has in fact been discovered that the advantages obtained by removing the contaminated portion only of the treatment material from the treatment column very greatly outweigh the inconvenience involved in installing a separate washing column. More particularly, the separate washing column is much less expensive to provide and much simpler to operate than are the prior art auxiliary devices necessary to achieve both regeneration and washing in a single container.

Furthermore, in accordance with the present invention it is possible to achieve a much more intense washing of the removed treatment material within the washing column, and accordingly the amount of fluid, normally water, required for washing is significantly reduced by more than half with respect to prior art systems. For example, where a given prior art washing operation requires 25 $m^3$ of washing water, an equal quality washing can be achieved according to the present invention with only 10 $m^3$ of washing water. That portion of the bed of treatment material into which the suspended solid particles do not penetrate can be rinsed after the regeneration operation within the treatment column.

With respect to a resin bed, it has in practice been found that regardless of the dimensions of the resin bed, the suspended solid particle in the water to be treated will penetrate only approximately thirty centimeters into the bed. Therefore, in accordance with the present invention it is only necessary to remove from the treatment column the top thirty centimeters deep layer of the resin bed and transfer such layer into the washing column.

However, it has also been found that during repeated regeneration of the resin bed during continued use thereof fine particles of the treatment material will be accumulated and concentrated in the top layer of the resin bed. Such fine particles of regenerating agent will be removed from the upper portion of the resin bed after the removal and washing thereof in the separate washing column.

Additionally however, it has been determined that such fine particles of treatment material will gradually accumulate in the top part of the remaining portion of the resin bed, i.e. that portion below the upper thirty centimeters deep layer which retains the suspended solid particles from the fluid being treated. In continuous service installations, this top part of the remaining portion of the resin bed is subjected to an unpacking operation to remove such gradually accumulated fine particles only very infrequently, for example approximately once per year.

This unpacking operation would be carried out after the upper portion of the resin bed is removed from the treatment column and passed to the washing column.

However, it would be difficult to carry out such unpacking operation when only the upper thirty centimeters of the resin bed are removed from the treatment zone, since the volume thereby provided above the remaining portion of the resin bed would be insufficient to allow satisfactory expansion of the bed to achieve unpacking capable of removing the fine particles. To perform a satisfactory unpacking operation it would be necessary to remove from between one-third and one-half of the resin bed from the treatment column.

Therefore, in accordance with the present invention, although as has been indicated above it is only necessary to remove the upper thirty centimeters of the resin bed and to wash such upper thirty centimeters to remove therefrom the solid particles from the fluid being treated, to avoid unnecessary complication and operation of the system of the present invention, in a preferred arrangement of the present invention the upper portion of the resin bed removed from the treatment column and introduced into the washing column comprises from one-half to one-third of the resin bed. Otherwise, it would be necessary to have a double removal system, i.e. one system to remove only the upper thirty centimeters of the resin bed during a normal unpacking and washing operation to remove solid particles, and a second removal system to remove an additional upper part of the resin bed during those times when it is necessary to remove accumulated fine particles of treatment material therefrom. It is however intended that such arrangement be within the scope of the invention.

It is to be understood that the appropriate time for carrying out the removal of the upper portion of the resin bed and transfer thereof to the washing column for carrying out the unpacking and washing operation would be achieved in any known and normal fashion, for example by measuring the loss of charge in the resin bed or measuring a pressure difference thereacross.

In accordance with the present invention, the treatment column is an elongated vertically extending container, preferably cylindrical, with closed ends. A treatment zone within the interior of the treatment column is defined by a bottom support member and an upper member. The entire treatment zone is filled with a bed of granular treatment material, for example a bed of ion exchange resin, and therefore cannot expand upwardly during regeneration. The upper closed end of the container has a liquid entrance pipe, and the upper member has therein a plurality of holes or openings for distributing the liquid to be treated downwardly into the bed of treatment material. The lower support member has therein a plurality of holes or openings to allow the treated liquid to pass outwardly from the bed of treatment material, and the lower closed end of the container has an outlet pipe for discharge of the thus treated material. During regeneration the flow of regenerating agent solution will be in the reverse direction, that is it will flow into the bottom closed end of the container and then through the distribution openings in the lower support member, upwardly through the bed of treatment material, and out the openings in the upper member and through the pipe in the upper end of the container. The container is furnished, at a position spaced from the top of the treatment zone by from one-third to one-half of the height of the treatment zone, with a pipe or conduit system which enables the upper portion of the resin bed to be removed from the treatment column and introduced into the washing column. Such removal is achieved by fluid pressure, for example water introduced through the pipe in the upper end of the container. The treatment container also has a further pipe, at a level closely below the level of the pipe system for removing the upper portion of the bed of treatment material, which enables the top part of the remaining portion of the bed of treatment material, i.e. that part in which fine particles of treatment material gradually accumulate as discussed above, to be removed from the container. Such removal is achieved by upward flowing fluid pressure, for example by water introduced into the bottom of the container.

The washing column preferably comprises an elongated vertically extending container including an upper substantially cylindrical portion and a lower substantially conical portion. Compressed gas is introduced into the conical portion, and washing fluid, for example water, is introduced into the bottom of the cylindrical portion, to achieve unpacking and washing of the treatment material.

In accordance with a further feature of the invention, there may be provided a layer of granular inert material within the interior of the cylindrical container, at a position directly above the upper portion of the bed of treatment material and directly below the upper member. Such inert material preferably has a specific gravity of less than one and may be formed of a plastic material, for example polypropylene, with a granule size of approximately 2 mm. This inert granular material floats and prevents any direct contact between the fine particles of the granular treatment material and the distributing openings or holes in the upper member. Thus, the layer of granular inert material prevents clogging or plugging of such holes. Generally, the layer of granular inert material may be approximately 10 to 15 cm thick to obtain the desired effect.

Additionally, the system of the invention may be adapted to the use of two superposed beds of ion exchange resins. In such case, if it is desired to regenerate the spent resins in a fluidized bed, which is particularly of interest for carboxylate resins with associated sulfuric acid regeneration, the superposed beds may be separated by an intermediate support platform, and only the section below the platform is totally filled with resins. The area above the platform is not totally filled with resins and maintains the configuration which is customary in the prior art. Thus, it is possible to regenerate the two superposed resin beds simultaneously.

BRIEF DESCRIPTION OF THE DRAWINGS

Other objects, features and advantages of the present invention will be apparent from the following detailed description, taken with the accompanying drawings, wherein.

DETAILED DESCRIPTION OF THE INVENTION

Figure 1:
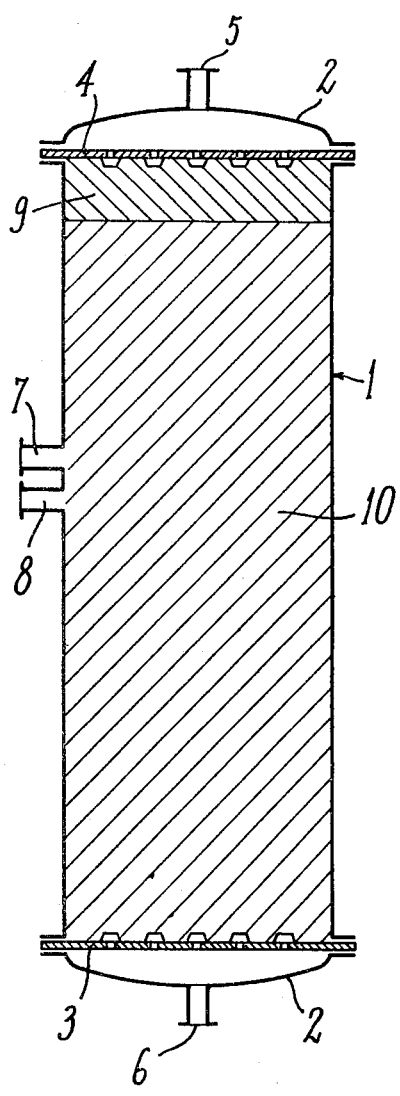
FIG. 1 is a schematic sectional view of a treatment column embodying the present invention.

With reference now to the drawings, a detailed description will be made of a preferred embodiment of the process and apparatus of the invention. In FIG. 1 there is shown a treatment column 1 which is preferably in the form of a cylindrical body having upper and lower convex end faces 2. A treatment zone is defined within the interior of the treatment column by means of a lower support plate or member 3 and an upper member or plate 4. Plates 3 and 4 have therethrough distributing holes or opening in a conventional manner, and for example may include nozzles such as schematically shown in FIG. 1. The entire treatment zone between plates 3 and 4 is filled with a bed of granular treatment material 10. In the arrangement illustrated in FIG. 1, there is provided on top of the bed of treatment material a layer 9 of granular inert material to prevent fine particles of the bed of treatment material from clogging or plugging the distribution holes in the upper plate 4. In either case, i.e. either when the layer 9 is provided or when the layer 9 is not provided, the treatment zone between plates 3 and 4 is completely filled. Thereby, in accordance with the present invention the bed of treatment material 10 is packed or prevented from expanding upwardly during the regeneration operation.

During a normal treatment operation, fluid to be treated, for example water, is introduced inwardly through pipe 5 and then passes through the distribution openings in plate 4 and passes downwardly through the bed of treatment material 10, thereby treating the fluid. The treated fluid passes through the openings in lower support plate 3, and the treated fluid is then discharged through outlet pipe 6.

Periodically it is necessary to regenerate the bed of treatment material, and during such regeneration operation the flow is countercurrent to the above-discussed flow during the normal treatment operation. Thus, during the regeneration operation a solution including a regenerating agent is introduced through pipe 6 and then passes through distributing openings in plate 3 and passes upwardly through the bed of treatment material, thereby regenerating the bed of treatment material. The spent regenerating solution passes through the openings in upper plate 4 and is then discharged through pipe 5.

The fluid to be treated, for example wastewater, inevitably has suspended therein solid particles. These solid particles are removed from the fluid by the upper portion of the bed of treatment material and are retained in such upper portion. Thus, the bed of treatment material gradually becomes clogged to an unacceptable extent due to accumulation of the retained solid particles. When this condition is reached, it is necessary to remove such retained solid particles. In accordance with the present invention, this is done by interrupting operation of the treatment column 1 and removing only the upper portion of the bed of treatment material from the treatment column 1 and passing such removed portion to a washing column 21. This is done by closing pipe 6, and opening a pipe 7 located in the side of treatment column 1, at a position below the top of the treatment zone by an amount of from one-third to one-half of the height of the treatment zone. Thus, the upper portion of the bed of treatment material is removed through pipe 7, for example by introducing fluid, for example liquid to be treated, through pipe 5 and thereby flowing the upper portion of the bed of treatment material out through pipe 7 in a downward direction. Such removed portion of treatment material is introduced into washing container 21 shown in FIG. 2 of the drawings via pipe 24.

As discussed above, during repeated and extended operation of the system fine particles of the bed of granulated treatment material will tend to accumulate in the upper portions of the bed of treatment material. It eventually becomes necessary to remove such fines, although as indicated above this is normally done only rarely, for example once a year. However, in accordance with the present invention such removal may be associated with the above removal and washing operation of the present invention. Thus, a further pipe 8 is located at a level closely below the level of pipe 7. At least a part of the portion of the bed of treatment material remaining in the treatment column after removal of the upper portion for the washing operation may be removed through pipe 8 by an upward flow achieved by introducing fluid, for example liquid to be treated through pipe 6, thereby also transferring such part of the remaining portion of the bed of treatment material to the washing column via pipe 24.

Figure 2:
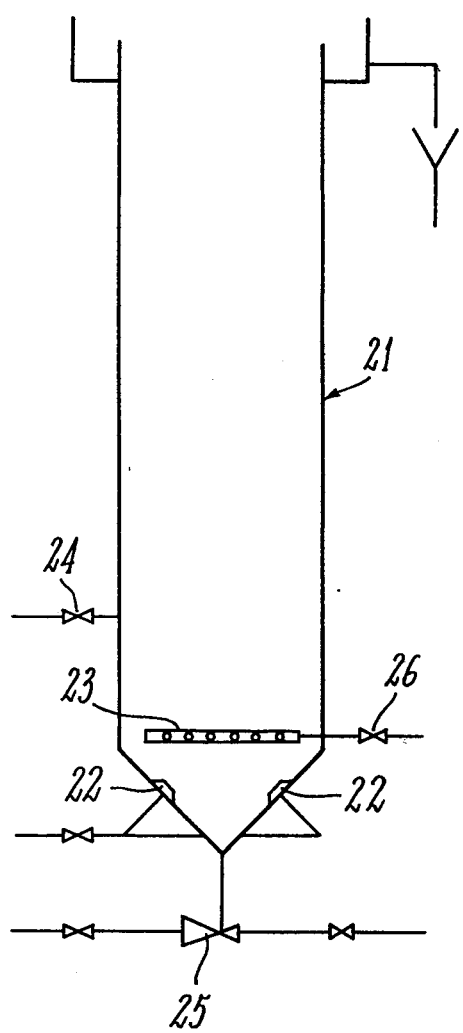
FIG. 2 is a schematic view of a washing column embodying the present invention.

As shown in FIG. 2, washing column 21 is a container including an upper cylindrical portion and a lower conical portion. The volume of column 21 is sufficient to hold all of the treatment material contained between plate 4 and pipe 8, and additionally the amount of fluid, for example water, required to transfer such treatment material to the column 21.

In the lower conical portion of the washing column 21 there are provided channels 22 to inject compressed gas, for example air, into the interior of the column 21 to achieve a precleaning by means of a mechanical mixing operation. A distributor 23 is located at the base of the cylindrical portion of column 21 for introducing washing fluid, for example water, which will result in a rising washing action to permit unpacking and washing of the treatment material. This will achieve a separation and removal of the solid particles, and also of fine particles of treatment material. Such removed particles will rise upwardly to the top of the washing column and may be removed in a conventional manner by means of an overflow and a discharge as shown schematically in FIG. 2.

The thereby cleaned treatment material will settle in the bottom portion of the washing column 21 and may be removed therefrom by means of a hydroejector 25 which is connected to the apex of the bottom conical portion. Hydroejector 25 may be any known type of device whereby a fluid, for example water, is injected past an orifice, thereby aspirating or exhausting a material from such orifice. Thereby, the cleaned and washed treatment material may be transferred by hydroejector 25 back to the treatment column 1, thereby replenishing the upper portion of the bed of treatment material. In accordance with a specific feature of the present invention, such cleaned and washed treatment material is transferred back to the treatment column 1 via pipe 7.

When the transfer of the thus cleaned and washed treatment material is completed, additional water may be introduced via valve 26 and distributor 23 to enable complete removal of the treatment material, for example resin, remaining in the connecting pipes in the washing column by spraying the water over such pipes. Thus, any resins remaining between the distributor 23 and the bottom of the washing column 21 are washed away by again using the hydroejector 25. This rinsing is important to avoid any risk of mixing resins which have different functions, for example if only a single washing column 21 is used to wash different types of resins in a system employing a sequential demineralization and employing separate resins.

Figure 3:
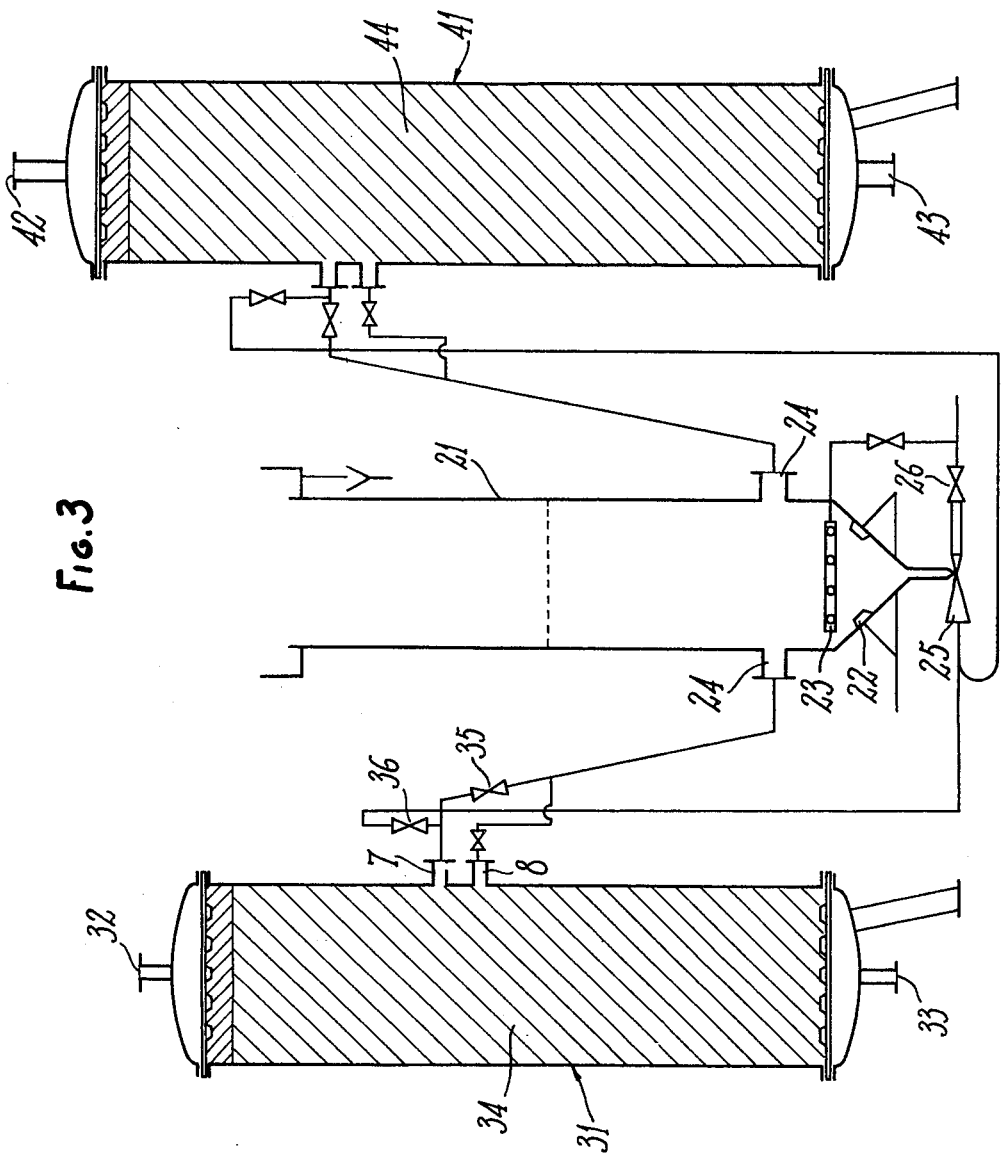
FIG. 3 is a schematic view illustrating a system including two separate treatment columns containing different resins, both treatment columns being associated with a single washing column according to the present invention.

With reference to FIG. 3 of the drawings there is shown a system for a sequential demineralization operation employing separate resins. Thus, a treatment column 31 contains a cationic ion exchange resin, and a separate treatment column 41 contains an anionic ion exchange resin. The water to be treated is introduced through pipe 32 and is decationized by a first resin 34. The water then passes through pipe 33 and is introduced through pipe 42 into a second resin 44, whereby the demineralization is completed. The treated water leaves the system through pipe 43.

In the system shown in FIG. 3, washing of the upper portions of the resin beds 34 and 44 are both achieved in the above-discussed manner in a single washing column 21. The washing operations are of course carried out separately. The following discussion will be of a washing operation of the upper portion of the bed 34. It will be understood however that the washing operation of the upper portion of bed 44 is similarly achieved, and FIG. 3 illustrates that two sets of pipes are provided, i.e. one set connecting washing column 21 with treatment column 31, and a second set connecting washing column 21 with treatment column 41.

Thus, when it is desired to carry out a washing operation of the upper portion of bed 34, valve 35 is opened, pipe 33 is closed, and water introduced through pipe 32 causes the upper portion of the bed 34 to flow downwardly and outwardly through pipe 7 and pipe 24 into washing column 21. When the transfer has been completed, valve 35 is closed, and compressed air is injected through channels 22 and water is injected through distributor 23, to thereby achieve washing and unpacking as described above. When these operations are completed, hydroejector 25 is operated to return the cleaned and washed resin through pipe 7 into the interior of column 31 by opening valve 36. As indicated above, washing of the upper portion of the bed 44 is carried out in a similar manner.

To illustrate the superiority of the process and apparatus of the present invention, two water demineralization processes were compared, one according to the present invention, and the other according to a prior art system including countercurrent washing in the treatment chamber.

In both processes water having the following salinity was treated at a rate of 8 m³/hour:

| Calcium | 4.2 meq/l* | Bicarbonates | 2.8 meq/l |
|---|---|---|---|
| Magnesium | 3.0 meq/l | Chlorides | 0.2 meq/l |
| Sodium | 2.2 meq/l | Sulfates | 6.4 meq/l |
|  | 9.4 meq/l |  | 9.4 meq/l |

*milliequivalents per liter

In addition, the water contained 15 mg/l of silica ($SiO_2$), i.e. silica powder of an unspecified fineness. To provide a ten-hour cycle, six hundred liters of cationic exchange resin and seven hundred fifty liters of anionic exchange resin were used. In the system according to the present invention, there were provided two treatment column, each having a diameter of 650 mm. The heights of the treatment zones, i.e. the distances between the plates 3 and 4, were 1800 mm and 2500 mm, respectively, for the cationic and the anionic treatment columns.

In the prior art system, the installations included (1) either two treatment columns each having a diameter of 800 mm and containing a cationic resin bed 2500 mm high and an anionic resin bed 3000 mm high, (2) or two treatment columns each having a diameter of 650 mm and a cationic resin bed 3500 mm high and an anionic resin bed 4000 mm high.

In carrying out the process according to the invention and the prior art process, equal results were obtained. Thus, for the same flow rates, equal quality of treated water was obtained. However, as will be apparent from the above, in accordance with the present invention it was possible to provide much smaller treatment columns and much smaller resin beds. Also, the prior art systems necessitated the provision of auxiliary equipment, for example intermediate grates having plungers, compressors, etc.

It is to be understood that the present invention is applicable to any type of system for treating fluids by means of granular adsorbent or ion exchange material. The particular treatment material employed does not in and of itself constitute the present invention, and any such material known in the prior art may be encompassed within the scope of the present invention. It will similarly be apparent that the regenerating agent employed would be any regenerating agent which is known as employable with the particular treatment material employed.

Although the present invention has been described and illustrated with respect to a preferred embodiment thereof, it is to be understood that various modifications may be made to the process and apparatus specifically described and illustrated without departing from the scope of the present invention.

What we claim is:

1. A process for treating fluids having solid particles suspended therein, said process comprising:
    providing a treatment column having an interior including a treatment zone completely filled with a bed of granular treatment material;
    conducting a treatment operation by passing a fluid to be treated in a downward direction through said bed of treatment material, thereby treating said fluid with said treatment material, and causing solid particles suspended in said fluid to be removed therefrom by an upper portion of said bed of treatment material and retained therein;
    periodically conducting a regeneration operation and regenerating said bed of treatment material by passing a regenerating agent in an upward direction through said bed of treatment material in said treatment zone within said treatment column; and
    periodically, upon a predetermined clogging of said bed of treatment material due to accumulated retention in said upper portion thereof of said solid particles, interrupting said treatment operation in said treatment column and conducting a washing operation comprising:
        removing said upper portion only of said bed of treatment material from said treatment column by flowing said upper portion in a downward direction from said treatment column;
        introducing the thus removed upper portion of said bed of treatment material into a washing column separate from said treatment column;
        within said washing column, washing said portion of said treatment material and removing therefrom said solid particles, to thereby form washed treatment material; and
        returning said washed treatment material from said washing column to said treatment zone to thereby replace said upper portion of said bed of treatment material.

2. A process as claimed in claim 1, further comprising providing within said interior of said treatment column, at a position directly above said upper portion of said bed of treatment material, a layer of granular inert material having a specific gravity less than 1.

3. A process as claimed in claim 1, wherein said upper portion of said bed of treatment material which is removed from said treatment column during said washing operation comprises from one-third to one-half of the total volume of said bed of treatment material.

4. A process as claimed in claim 1, 2 or 3, wherein during said regeneration operation fine particles of said treatment material are gradually accumulated in the upper part of said bed of treatment material, and further comprising, after said upper portion of said bed of treatment material is removed from said treatment column, removing said fine particles from the portion of said bed of treatment material remaining within said treatment column by passing a rinsing liquid upwardly through said remaining portion of said bed of treatment material within said treatment column.

5. A process as claimed in claim 1, 2 or 3 wherein during said regeneration operation fine particles of said treatment material are gradually accumulated in the upper part of said bed of treatment material, and further comprising, after said upper portion of said bed of treatment material is removed from said treatment column, removing from said treatment column at least the top part of the portion of said bed of treatment material remaining after removal of said upper portion by flowing said top part in an upward direction from said treatment column, introducing the thus removed top part into said washing column with said upper portion and therein washing said top part to remove therefrom said fine particles, and returning the thus washed top part with said washed upper portion to said treatment column.

6. A process as claimed in claim 1, wherein said step of removing comprises withdrawing said upper portion from said treatment column through a pipe extending into said treatment column at a position spaced from the top of said treatment zone by from one-third to one-half of the height of said treatment zone.

7. A process as claimed in claim 6, wherein said step of returning comprises introducing said washed treatment material into said treatment column through said pipe.

8. A process as claimed in claim 1, comprising removing said upper portion of said bed of treatment material from said treatment column and returning said washed treatment material to said treatment column at the same location in said treatment column.

9. A process as claimed in claim 1, wherein said treatment material comprises ion exchange resins.

10. An apparatus for treating fluids having solid particles suspended therein, said apparatus comprising:
a treatment column having an interior including a treatment zone completely filled with a bed of granular treatment material;
means for passing a fluid to be treated in a downward direction through said bed of treatment material, and for thereby treating said fluid with said treatment material, whereby solid particles suspended in said fluid are removed therefrom and retained by an upper portion of said bed of treatment material;
means for passing a regenerating agent in an upward direction through said bed of treatment material in said treatment zone within said treatment column, and for thereby periodically regenerating said bed of treatment material;
a washing column separate from said treatment column;
means for, upon a periodic interruption of the treatment operation in said treatment column when there occurs a predetermined clogging of said bed of treatment material due to accumulated retention of said solid particles in said upper portion thereof, removing said upper portion only of said bed of treatment material from said treatment column by flowing said upper portion in a downward direction from said treatment column, and for introducing the thus removed upper portion of said bed of treatment material into said washing column;
means within said washing column for therein washing said portion of said treatment material and for removing therefrom said solid particles, to thereby form washed treatment material; and
means for returning said washed treatment material from said washing column to said treatment zone, and for thereby replacing said upper portion of said bed of treatment material.

11. An apparatus as claimed in claim 10, wherein said treatment column comprises a cylindrical container having closed upper and lower ends, a support member within said container adjacent said lower end thereof for supporting said bed of treatment material, an upper member within said container adjacent said upper end thereof, and openings extending through said support member and said upper member.

12. An apparatus as claimed in claim 11, further comprising a layer of granular inert material within said interior of said cylindrical container at a position directly above said upper portion of said bed of treatment material and directly below said upper member, said inert material having a specific gravity less than 1, said layer of inert material comprising means for preventing particles of said bed of treatment material from clogging said openings in said upper member.

13. An apparatus as claimed in claim 10, wherein said removing means comprises a pipe extending into said treatment column at a position spaced from the top of said treatment zone by from one-third to one-half the height of said treatment zone.

14. An apparatus as claimed in claim 13, wherein said returning means comprises said pipe.

15. An apparatus as claimed in claims 13 or 14, wherein during said regenerating said bed of treatment material fine particles of said treatment material are gradually accumulated in the upper part of said bed of treatment material, and further comprising means for, after said upper portion of said bed of treatment material is removed from said treatment column, withdrawing from said treatment column at least the top part of the portion of said bed of treatment material remaining after removal of said upper portion by flowing said top part in an upward direction from said treatment column, and for introducing the thus withdrawn top part into said washing column with said upper portion, whereafter said upper portion and top part are together washed and returned to said treatment column.

16. An apparatus as claimed in claim 15, wherein said withdrawing means comprises a further pipe extending into said treatment column at a level closely below the level of said pipe.

17. An apparatus as claimed in claim 10, wherein said washing column includes an upper substantially cylindrical portion and a lower substantially conical portion.

18. An apparatus as claimed in claim 17, wherein said washing means comprises a liquid distributor for introducing washing liquid into the lower part of said cylindrical portion, and means for introducing compressed gas into said conical portion.

* * * * *